US008041605B1

(12) United States Patent
Harrity

(10) Patent No.: US 8,041,605 B1
(45) Date of Patent: Oct. 18, 2011

(54) ADVANCE ORDER SYSTEM

(76) Inventor: John Eric Harrity, Centreville, VA (US)

( * ) Notice: Subject to any disclaimer, the term of this patent is extended or adjusted under 35 U.S.C. 154(b) by 1637 days.

(21) Appl. No.: 11/250,555

(22) Filed: Oct. 17, 2005

Related U.S. Application Data

(60) Provisional application No. 60/618,993, filed on Oct. 18, 2004, provisional application No. 60/708,788, filed on Aug. 17, 2005.

(51) Int. Cl.
*G06Q 30/00* (2006.01)
(52) U.S. Cl. .......... 705/15; 705/5; 705/16; 705/21; 340/3; 340/286; 340/988; 340/994
(58) Field of Classification Search .......... 705/15
See application file for complete search history.

(56) References Cited

U.S. PATENT DOCUMENTS

| | | | | |
|---|---|---|---|---|
| 5,939,974 A | * | 8/1999 | Heagle et al. | 340/286.09 |
| 6,876,973 B1 | * | 4/2005 | Visconti | 705/5 |
| 2004/0181439 A1 | * | 9/2004 | Kakuta et al. | 705/5 |
| 2005/0080675 A1 | * | 4/2005 | Lovegreen et al. | 705/15 |
| 2005/0157865 A1 | * | 7/2005 | Yeager et al. | 379/266.06 |

OTHER PUBLICATIONS

Restaurant Revenue Management: Implementation at Chevys Arrowhead. Kimes, Sheryl E. Cornell Hotel & Restaurant Administration Quarterly, v45n1, p. 52-67, Feb. 2004 (includes References Tables).*

* cited by examiner

*Primary Examiner* — F. Zeender
*Assistant Examiner* — Fawaad Haider

(57) ABSTRACT

A system includes a master device and a slave device. The slave device is configured to provide a customer waiting to be seated at a restaurant with menu information for the restaurant, receive at least one of a drink order or a food order from the customer while the customer is waiting to be seated at the restaurant, and transmit the at least one of a drink order or a food order. The master device is configured to receive the at least one of a drink order or a food order from the slave device, and cause the at least one of a drink order or a food order to be forwarded to a kitchen of the restaurant based on at least one of a position of the customer on a waiting list or an estimated amount of time until the customer will be seated.

20 Claims, 12 Drawing Sheets

ADVANCE ORDER SYSTEM

RELATED APPLICATIONS

This application claims priority under 35 U.S.C. §119 based on U.S. Provisional Application No. 60/618,993 filed Oct. 18, 2004, and U.S. Provisional Application No. 60/708,788, filed Aug. 17, 2005, the entire disclosures of which are hereby incorporated herein by reference.

FIELD OF THE INVENTION

Implementations consistent with the principles of the invention relate generally to master-slave devices, and more specifically, to a master-slave system that allows customers at a restaurant to order menu items while the customer is waiting to be seated at a restaurant.

BACKGROUND OF THE INVENTION

Customers visiting a restaurant, often have to deal with a waiting period that can last anywhere from a few minutes to possibly hours. Long waiting periods lead to customer dissatisfaction and the possibility of losing customers. When a customer is eventually seated, the customer often has to wait for a waiter or waitress to visit his/her table to take his/her drink or food order. Again, this waiting time can be anywhere from a few minutes to tens of minutes.

SUMMARY OF THE INVENTION

In accordance with one implementation consistent with the principles of the invention, a system includes a master device and a slave device. The slave device is configured to provide a customer waiting to be seated at a restaurant with menu information for the restaurant, receive at least one of a drink order or a food order from the customer while the customer is waiting to be seated at the restaurant, and transmit the at least one of a drink order or a food order. The master device is configured to receive the at least one of a drink order or a food order from the slave device, and cause the at least one of a drink order or a food order to be forwarded to a kitchen of the restaurant based on at least one of a position of the customer on a waiting list or an estimated amount of time until the customer will be seated.

In accordance with another implementation, a method includes associating, in a master device, a slave device with a customer waiting to be seated at a restaurant; obtaining one or more menu items from the customer via the slave device while the customer is waiting to be seated at the restaurant; associating the one or more menu items with the customer in the master device; detecting that a position of the customer on a waiting list or an estimated waiting time for the customer has reached a predetermined value; and forwarding the one or more menu items to a kitchen of the restaurant in response to the detecting. The forwarding occurs while the customer is waiting to be seated at the restaurant.

In yet another implementation, a method includes providing a customer waiting to be seated at a restaurant with menu information for the restaurant; receiving at least one of a drink order or a food order from the customer based on the providing as the customer is waiting to be seated at the restaurant; and forwarding the at least one of a drink order or a food order to a kitchen of the restaurant based on at least one of a position of the customer on a waiting list or an estimated amount of time until the customer will be seated. The forwarding occurs while the customer is waiting to be seated at the restaurant.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Exemplary System

Figure 1:
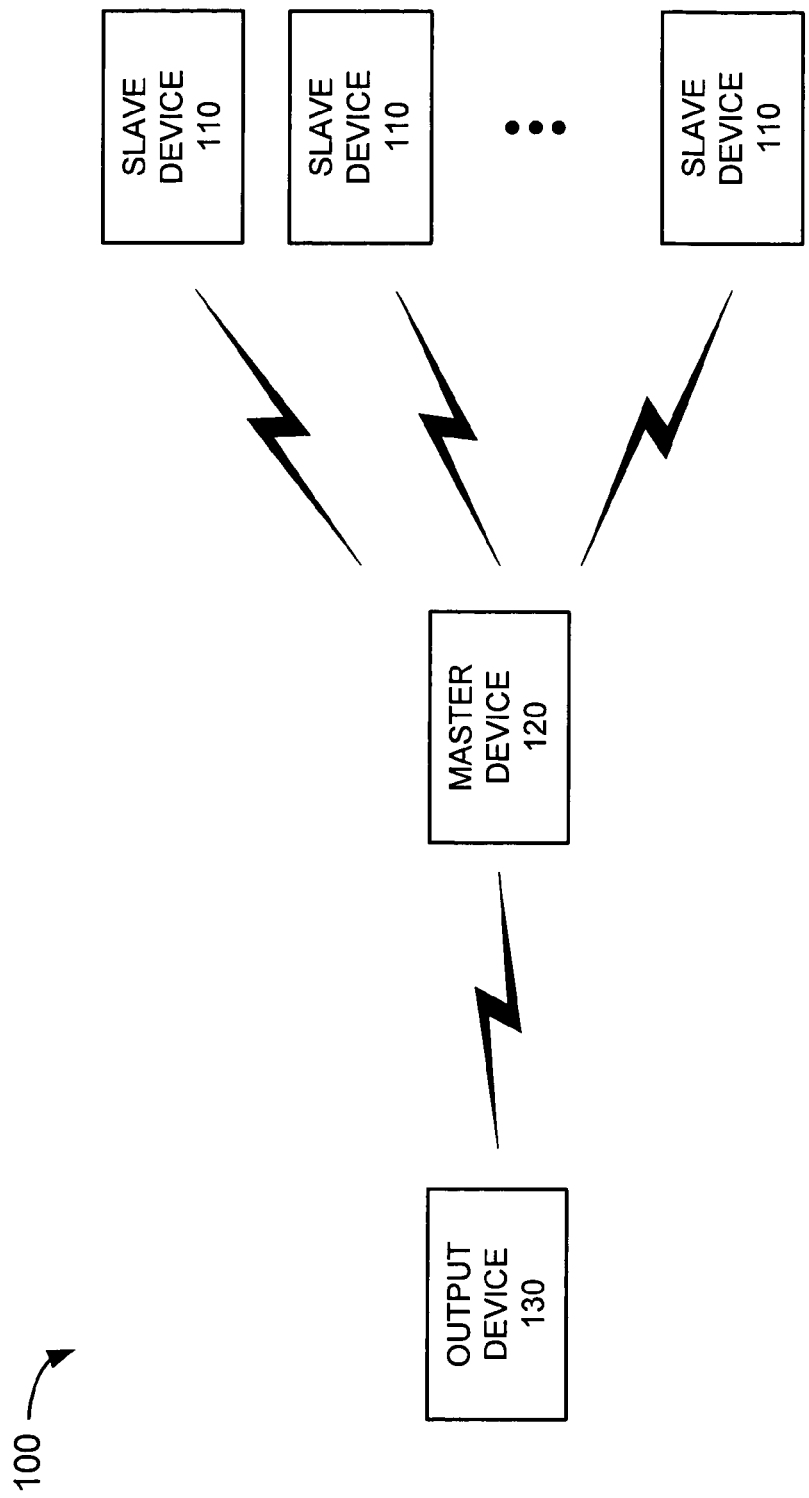
FIG. 1 is an exemplary diagram of a system in which systems and methods consistent with the principles of the invention may be implemented.

FIG. 1 is an exemplary diagram of a system 100 in which systems and methods consistent with the principles of the invention may be implemented. System 100 may include a group of slave devices 110, a master device 120, and an output device 130. Implementations consistent with the principles of the invention will be described hereafter in relation to restaurant service. It will be appreciated that the techniques described herein are equally applicable to other types of service facilities.

Slave devices 110 may include a device that provides information to and possibly receives information from a customer during the time that the customer is waiting to be seated at a restaurant. In one implementation, slave devices 110 may allow customers to pre-order one or more food or drink items from the restaurant's menu while the customers are still waiting to be seated at the restaurant. Slave devices 110 may provide information to the customers via an output device, such as a display and/or a speaker. Slave devices 110 may receive information from the customer via an input device, such as a microphone or keypad. In one implementation, slave devices 110 may include multiple handheld devices that are associated with individual waiting customers at the restaurant. In another implementation, slave devices 110 may include a single (or multiple) standalone devices that are not associated with individual customers. Slave devices 110 may receive and, in some instances, send information to master device 120. Slave devices 110 may connect to master device 120 via wired, wireless, or optical connections.

Master device 120 may include a device that stores information and possibly transmits information to slave devices 110 and/or output device 130. In one implementation, master device 120 may include any type of computer system, such as a mainframe, minicomputer, personal computer, laptop, or the like.

Output device 130 may include one or more devices for providing orders to a kitchen of the restaurant. In one implementation, output device 130 may include a printer from which an order may be produced in hard copy format, a display device that may be located in or near the kitchen of the restaurant that may provide an order visually, a speaker that may be located in or near the kitchen of the restaurant that may provide an order audibly, a combination of these devices or other devices. Output device 130 may connect to master device 120 via wired, wireless, or optical connections.

It will be appreciated that the number of devices illustrated in FIG. 1 is provided for simplicity. A typical system may include more or fewer slave devices 110, master devices 120, and output devices 130. Moreover, in some implementations consistent with the principles of the invention, master device 120 may perform one or more functions described as being performed by slave device 110 or output device 130. Slave device 110 may perform one or more of the functions described as being performed by master device 120 or output device 130. Output device 130 may perform one or more functions described as being performed by slave device 110 or master device 120.

Exemplary Slave Device Configuration

Figure 2:
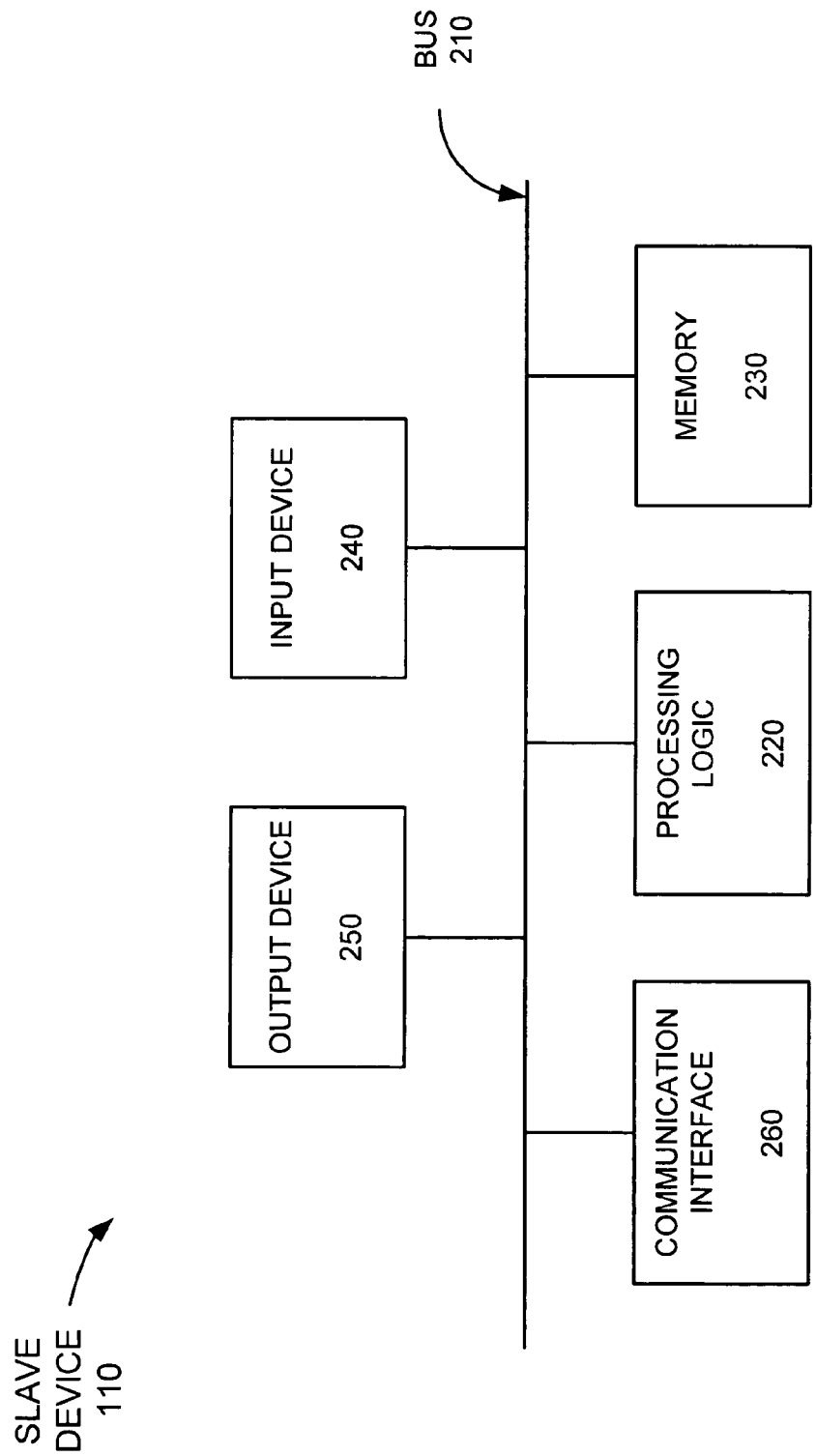
FIG. 2 is an exemplary diagram of the slave device of FIG. 1 in an implementation consistent with the principles of the invention.

FIG. 2 is an exemplary diagram of slave device 110 in an implementation consistent with the principles of the invention. Slave device 110 may include a bus 210, processing logic 220, a memory 230, an optional input device 240, an output device 250, and a communication interface 260. Bus 210 permits communication among the components of slave device 110.

Processing logic 220 may include any type of processor or microprocessor that interprets and executes instructions. In alternative implementations, processing logic 220 may include logic, such as a field programmable gate array, application specific integrated circuit, etc. Memory 230 may include a random access memory (RAM) or another dynamic storage device that stores information and instructions for execution by processing logic 220; a read only memory (ROM) or another type of static storage device that stores static information and instructions for use by processing logic 220; and/or some other type of magnetic or optical recording medium and its corresponding drive.

Optional input device 240 may include a mechanism that permits a customer to input information to slave device 110, such as a keyboard (or keypad), a mouse, a pen, a biometric mechanism, such as a voice recognition device, a touch screen, etc. Output device 250 may include a mechanism that outputs information to the customer, including a display, a speaker, etc. Communication interface 260 may include any transceiver-like mechanism that enables slave device 110 to communicate with other devices and/or systems, such as master device 120.

As will be described in detail below, slave device 110, consistent with the principles of the invention, may provide information to and possibly receive information from customers while they are waiting to be seated at a restaurant. Slave device 110 may perform these and other operations in response to processing logic 220 executing software instructions contained in a computer-readable medium, such as memory 230. A computer-readable medium may be defined as one or more memory devices and/or carrier waves. The software instructions may be read into memory 230 from another computer-readable medium or from another device via communication interface 260. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary Master Device Configuration

Figure 3:
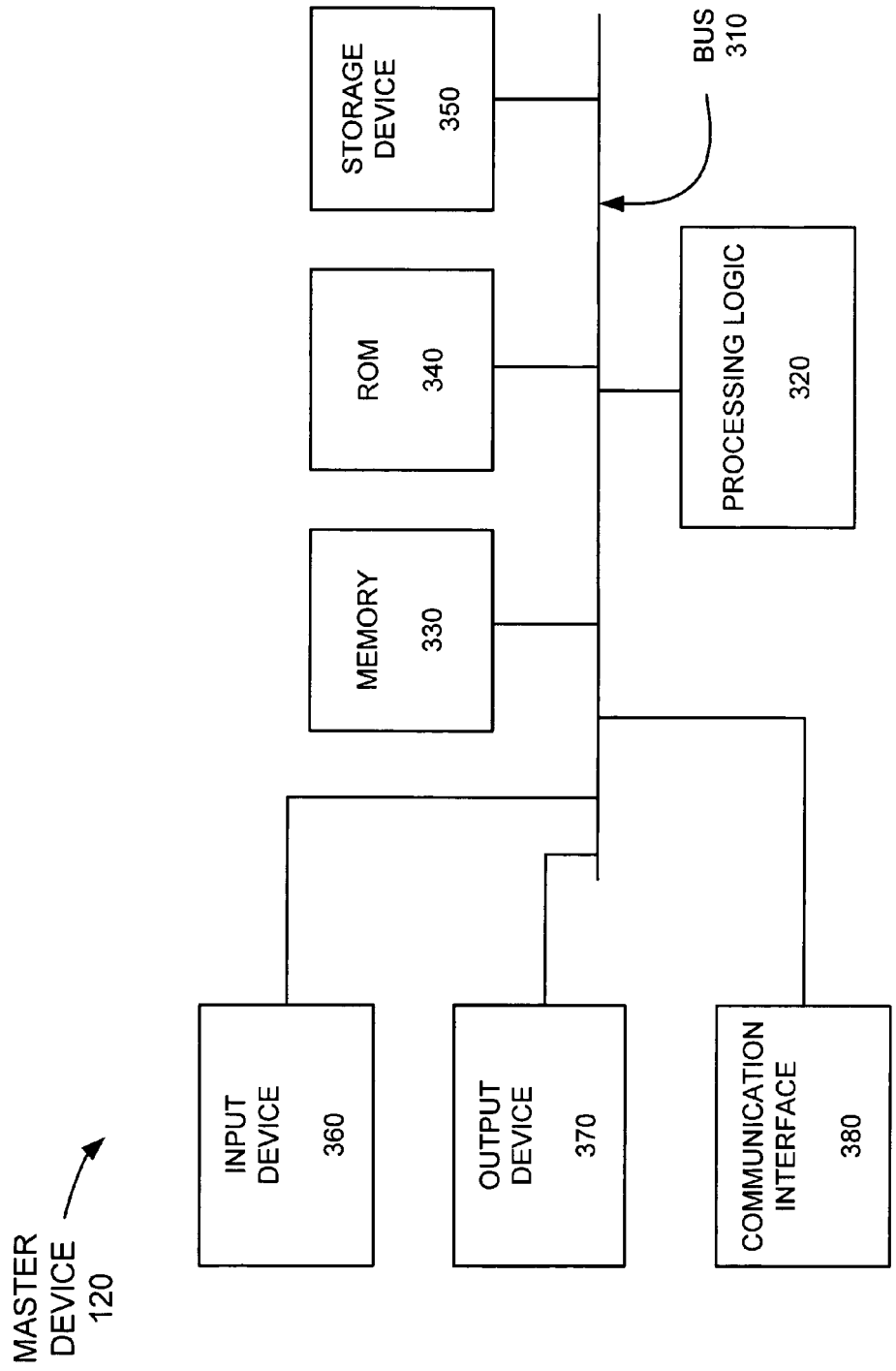
FIG. 3 is an exemplary diagram of the master device of FIG. 1 in an implementation consistent with the principles of the invention.

FIG. 3 is an exemplary diagram of master device 120 in an implementation consistent with the principles of the invention. Master device 120 may include a bus 310, processing logic 320, a main memory 330, a ROM 340, a storage device 350, an input device 360, an output device 370, and a communication interface 380. Bus 310 may permit communication among the components of master device 110.

Processing logic 320 may include any type of processor or microprocessor that interprets and executes instructions. In alternative implementations, processing logic 320 may include logic, such as a field programmable gate array, application specific integrated circuit, etc. Main memory 330 may include a RAM or another type of dynamic storage device that stores information and instructions for execution by processing logic 320. ROM 340 may include a ROM device or another type of static storage device that stores static information and instructions for use by processing logic 320. Storage device 350 may include a magnetic and/or optical recording medium and its corresponding drive.

Input device 360 may include a mechanism that permits an administrator to input information to master device 120, such as a keyboard, a mouse, a pen, a biometric mechanism, such as a voice recognition device, etc. Output device 370 may include a mechanism that outputs information to the administrator, including a display, a printer, a speaker, etc. Communication interface 380 may include any transceiver-like mechanism that enables master device 120 to communicate with other devices and/or systems, such as slave devices 110. Communication interface 380 may also enable master device 120 to communicate with other devices on a network, such as the Internet.

As will be described in detail below, master device 120, consistent with the principles of the invention, may store orders from customers while the customers are waiting to be seated at a restaurant and provide the stored orders to output device 130. Master device 120 may perform these and other operations in response to processing logic 320 executing software instructions contained in a computer-readable medium, such as memory 330. The software instructions may be read into memory 330 from another computer-readable medium, such as data storage device 350, or from another device via communication interface 380. The software instructions contained in memory 330 may cause processing logic 320 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Figure 4A:
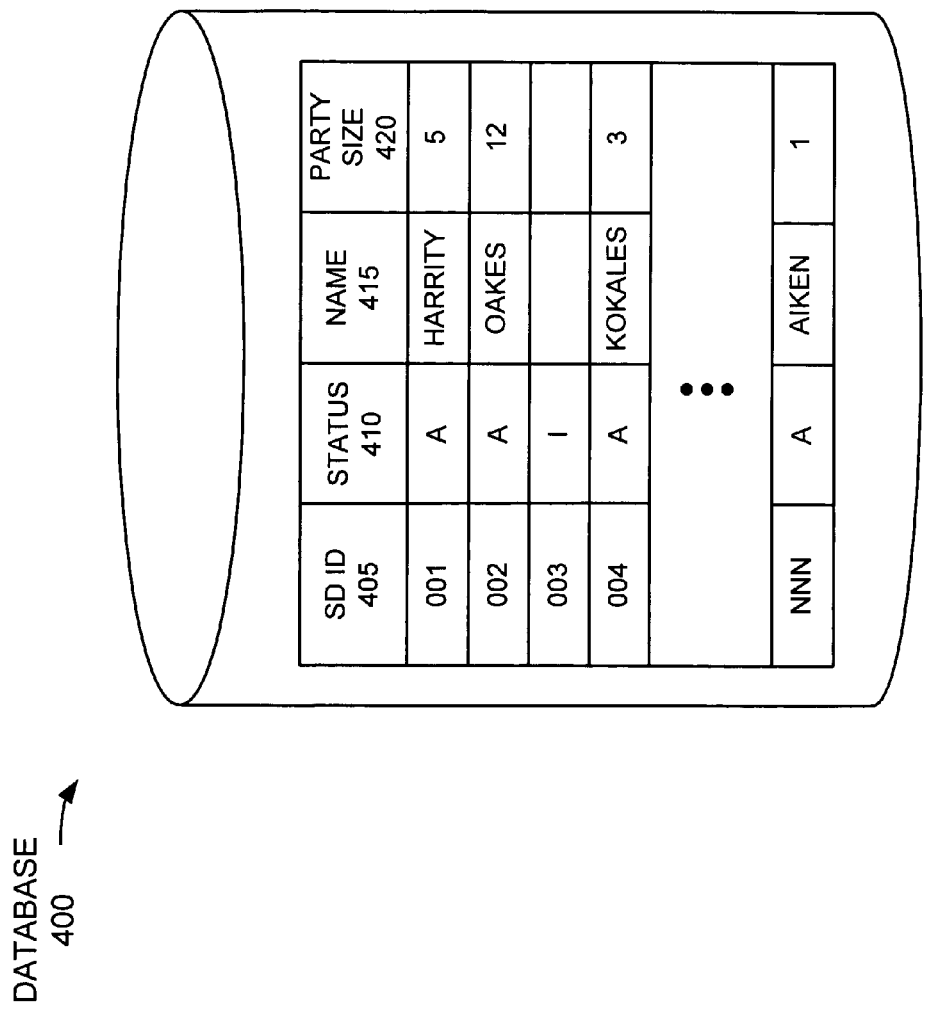
FIGS. 4A and 4B are exemplary diagrams of databases that may be associated with the master device of FIG. 1 in an implementation consistent with the principles of the invention.
Figure 4B:
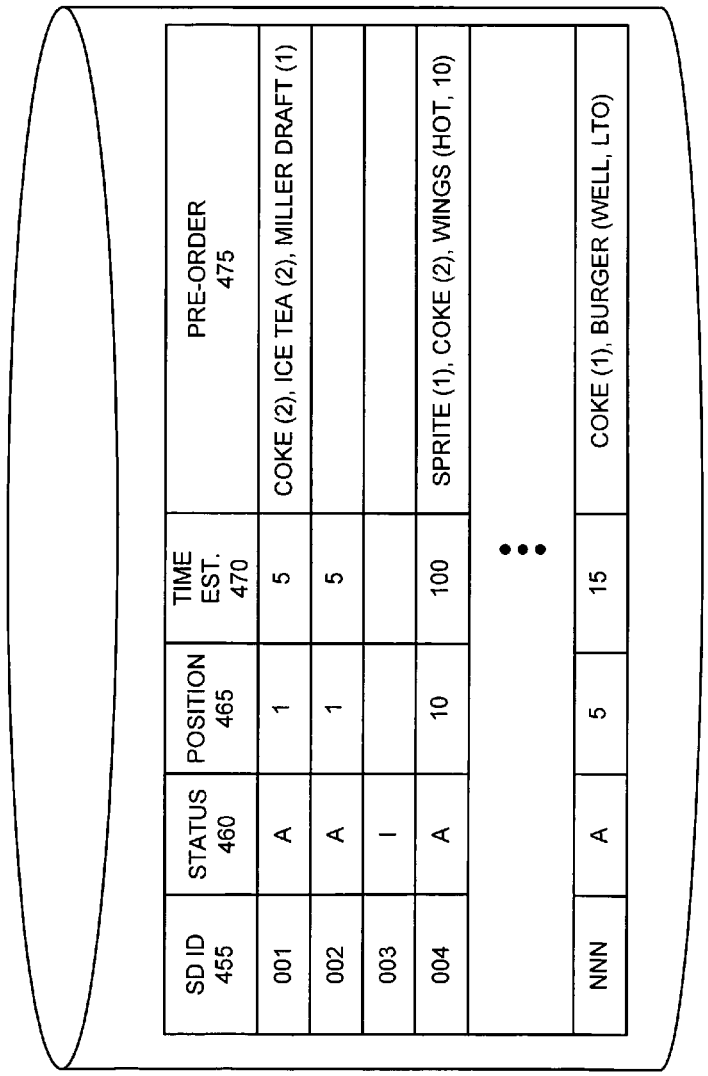

FIGS. 4A and 4B are exemplary diagrams of databases 400 and 450 that may be associated with master device 120 in an implementation consistent with the principles of the invention. Databases 400 and 450 may be stored within master device 120 (e.g., in storage device 350) or located external to master device 120. As illustrated in FIG. 4A, database 400 may includes a group of entries. Each entry may include information stored in one or more of the following exemplary fields: a slave device (SD) identification (ID) field 405, a status field 410, a party name field 415, and a party size field 420. Database 400 may contain additional fields than illustrated in FIG. 4A.

Slave device identification field 405 may store an identifier that uniquely identifies a slave device 110. The identifier may include, for example, a unique group of characters. Status field 410 may store information indicating whether the slave device 110 identified in the slave device identification field 405 is active (i.e., whether the slave device 110 has customer information associated with it and has been given to a waiting customer). In one implementation, status field 410 may indicate that a slave device 110 is active (A) or inactive (I). It will be appreciated that for a slave device 110 in an inactive state, database 400 may not store information for that slave device 110 or master device 120 may clear any information stored in database 400 for that slave device 110. For example, slave device 003 is depicted as inactive in FIG. 4A.

Party name field 415 may store information identifying the customer's party to which the slave device identified in field 405 has been associated. In one implementation, the information may include a first or last name for the customer or another one of the members of the customer's party. Party size field 420 may store information identifying the number of people in the customer's party.

As illustrated in FIG. 4B, database 450 may includes a group of entries. Each entry may include information stored in the following exemplary fields: a slave device (SD) identification (ID) field 455, a status field 460, a position field 465, a time estimate field 470, and a pre-order field 475. Database 450 may contain additional fields than illustrated in FIG. 4B.

Slave device identification field 455 may store an identifier that uniquely identifies a slave device 110. The identifiers in field 455 may correspond to the identifiers stored in field 405 (FIG. 4A). Status field 460 may store information indicating whether the slave device 110 identified in the slave device identification field 405 is active (i.e., whether the slave device 110 has customer information associated with it and has been given to a waiting customer). The status in status field 460 for a particular slave device 110 may correspond to the status of the slave device in field 410.

Position field 465 may store information identifying the customer's position on the waiting list of the restaurant. In one implementation, position field 465 may store a number to indicate a customer's position on the waiting list. Master device 120 may periodically recalculate the values in position field 465. In one implementation, master device 120 may recalculate the values in position field 465 each time a slave device 110 becomes inactive. In other implementations, master device 120 may recalculate the values in position field 465 at configurable time intervals.

Time estimation field 470 may store a value indicating an approximate time that a customer will have to wait to be seated. In one implementation, the value may be stored in minutes (or another time unit or combination of time units). Master device 120 may determine the value in time estimation field 470 automatically based, for example, on the value in position field 465. For example, the value in time estimation field 470 may be multiplied by a predetermined time value to determine the time estimation value. In one implementation, the predetermined time value may range from approximately 2 minutes to approximately 20 minutes. As an example, as illustrated in FIG. 4B, the customer associated with slave device 004 is $10^{th}$ on the waiting list. Master device 120 may estimate the customer's waiting time by multiplying "10" (the customer's position on the waiting list) by the predetermined time value (which, in this example, is 10). In other implementations, an administrator of master device 120 may manually enter (or adjust) the values in position field 465 and/or time estimation field 470. Master device 120 may recalculate the values in time estimation field 470 at configurable time intervals, when a customer's position on the waiting list changes, or at other times.

Pre-order field 475 may store information identifying item(s) that a customer associated with the slave device identified in field 455 has ordered while the customer is waiting to be seated at the restaurant. The pre-order items may include drink and/or food items. In the exemplary database 450 illustrated in FIG. 4B, the customer associated with slave device 004 has pre-ordered a sprite, two cokes, and an order of 10 hot wings.

While databases 400 and 450 are shown as separate databases, these databases may be implemented as a single database or distributed databases.

Exemplary Processing

Figure 5:
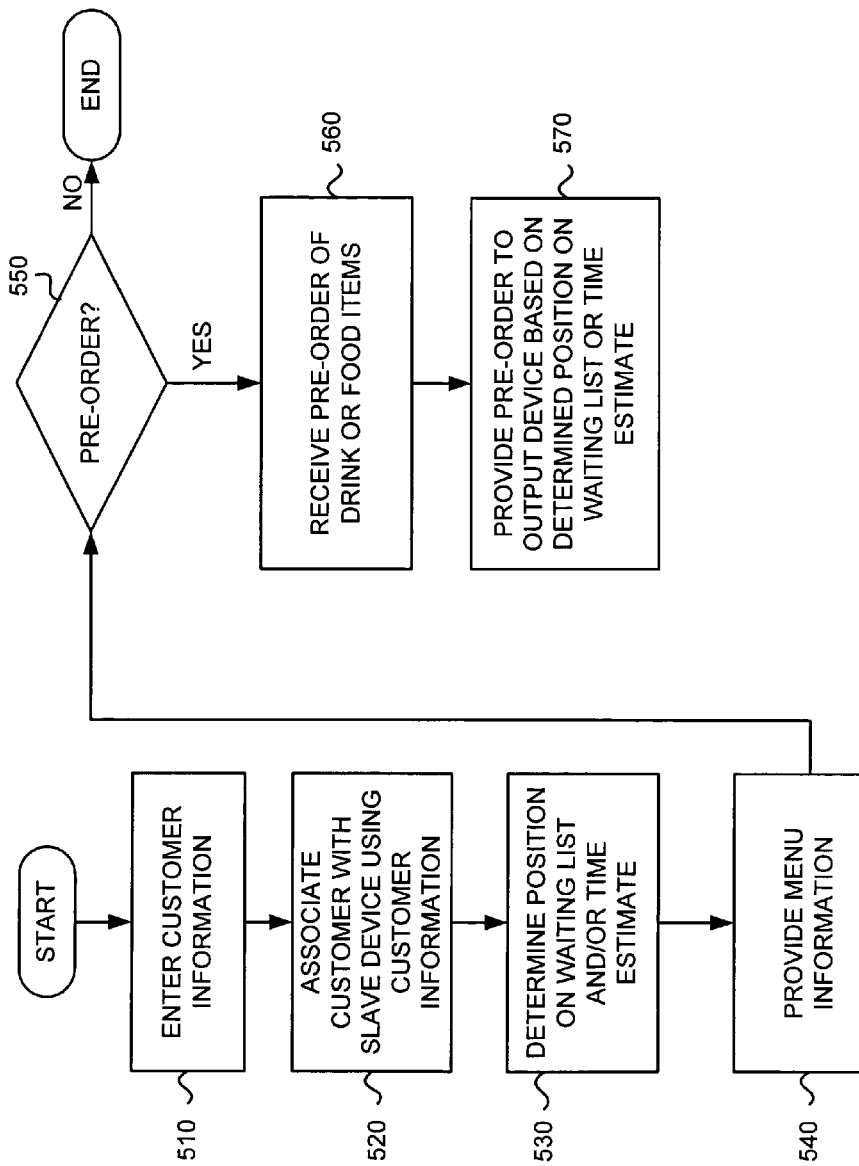
FIG. 5 is a flow chart of an exemplary process for pre-ordering menu items in an implementation consistent with the principles of the invention.

FIG. 5 is a flow chart of an exemplary process for pre-ordering menu items in an implementation consistent with the principles of the invention. Processing may begin by entering customer information into master device 120 (act 510). The customer information may include, for example, the customer's name, the number of people in the customer's party, the customer's seating preference (e.g., non-smoking, smoking, or first available), etc. In one implementation, the customer information is entered into master device 120 via an administrator (e.g., a hostess at the restaurant). In another implementation, the customer may enter the customer information into master device 120 or into a slave device 110, which can subsequently transmit the information to master device 120. The customer may be associated with a slave device 110 (act 520). An administrator associated with master device 120 may associate a customer with a slave device 110 by associating the customer's information in database 400 with a slave device 110 or the association may occur automatically in the situation, for example, when a slave device 110 transmits the customer information to master device 120. The customer information may be stored in the appropriate entry corresponding to the slave device 110 in database 400.

Figure 6:
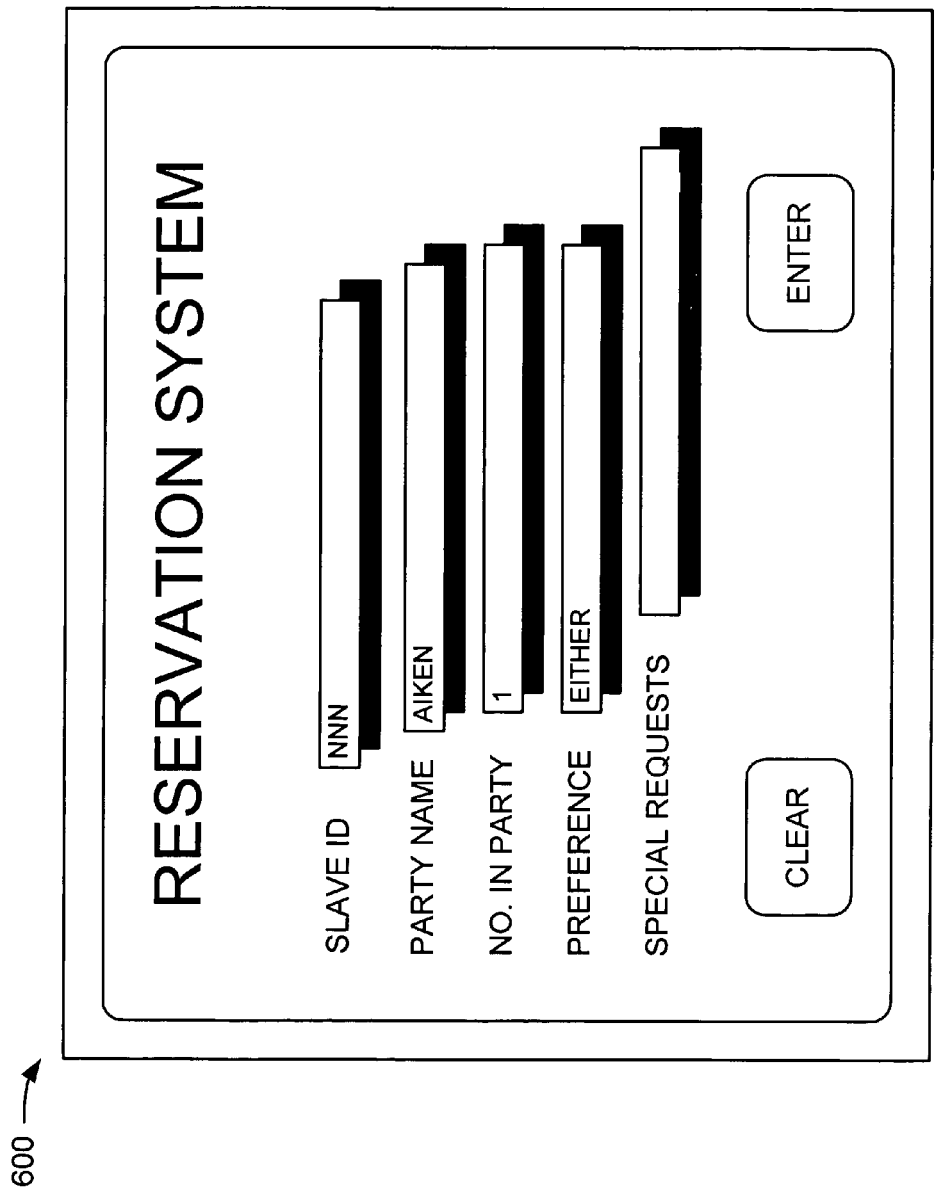
FIG. 6 is an exemplary graphical interface that may be associated with the master device or slave device of FIG. 1 in an implementation consistent with the principles of the invention.

FIG. 6 is an exemplary graphical interface 600 that may be associated with master device 120 or slave device 110 in an implementation consistent with the principles of the invention. As illustrated, an administrator (e.g., a restaurant hostess) may enter the customer's (or party's) name, the number of people in the customer's party, and/or information relating to the customer's party and associate this customer information with a slave device 110 by entering a slave device identifier into interface 600. In response to entering this information, master device 120 may, for example, store the information in the appropriate location in database 400. When graphical user interface 600 is associated a slave device 110, the slave device identifier may be automatically filled in.

Once the customer information has been entered into master device 120 and a slave device 110 has been associated with a customer, master device 120 may determine the position of the customer on the restaurant's waiting list and determine an estimated time that the customer will have to wait to be seated (act 530). In one implementation, master device 120 may initially determine the customer's position on the waiting list automatically (e.g., by assigning a highest waiting list number to the customer). As an example, if the restaurant currently has two parties waiting to be seated, master device 120 may determine the customer's waiting list position to be "3." Alternatively, an administrator may initially enter the customer's waiting list position.

Master device 120 may determine the customer's initial estimated waiting time automatically or based on input from the administrator. For example, master device 120 may determine the customer's initial estimated waiting time based on the customer's waiting list position. Master device 120 may, as set forth above, calculate the estimated waiting time by multiplying the waiting list position by a predetermined time value. In one implementation, the predetermined time value may range from approximately 2 minutes to approximately 20 minutes. An administrator of master device 120 may adjust (or set) a customer's initial position on the waiting list and/or the initial time estimate. Master device 120 may store the initial waiting list position and/or initial estimated waiting time in database 450. Master device 120 may periodically adjust the waiting list position and/or the estimated waiting time. In one implementation, master device 120 may re-adjust the waiting list position and/or estimated waiting time in response, for example, to a customer being removed from the waiting list.

Menu information may be provided to the customer (act 540). In one implementation consistent with the principles of the invention, the menu information may be provided to the slave device 110 associated with the customer. For example, master device 120 may transmit some or all of the restaurant's menu to the customer's slave device 110. In another implementation consistent with the principles of the invention, the menu information may be provided manually (e.g., by handing a menu to the customer). As set forth above, the menu information may include some or all of the restaurant's menu.

At some point during the time that the customer is waiting to be seated at the restaurant, the customer may be provided with the opportunity to pre-order one or more items from the restaurant's menu that will be delivered once the customer is eventually seated at the restaurant (act 550). In one implementation consistent with the principles of the invention, a waitress or waiter may ask the customer whether he/she wishes to pre-order. In another implementation, master device 120 may cause a graphical user interface to be displayed on slave device 110 with which the customer is associated that allows the customer to pre-order menu items. In yet another implementation, slave device 110 may be configured to automatically provide a graphical user interface to the customer.

If the customer does not wish to pre-order (act 550), processing may end with the customer being seated in a typical manner and given the opportunity to order once the customer has been seated. If, on the other hand, the customer expresses a desire to pre-order (act 550), the pre-order items may be obtained (act 560). In one implementation, the pre-order items may be obtained by a waitress or waiter. In another implementation consistent with the principles of the invention, the pre-order items may be obtained using slave device 110. In either of these situations, the pre-order items may be stored in field 475 of database 450 in master device 120.

FIGS. 7-10 are exemplary graphical user interfaces that allow for the pre-order of menu items in an implementation consistent with the principles of the invention. The graphical user interfaces may be associated with master device 120 or the customer's slave device 110. It is assumed for explanatory purposes only that the graphical user interfaces illustrated in FIGS. 7-10 are associated with master device 120.

Figure 7:
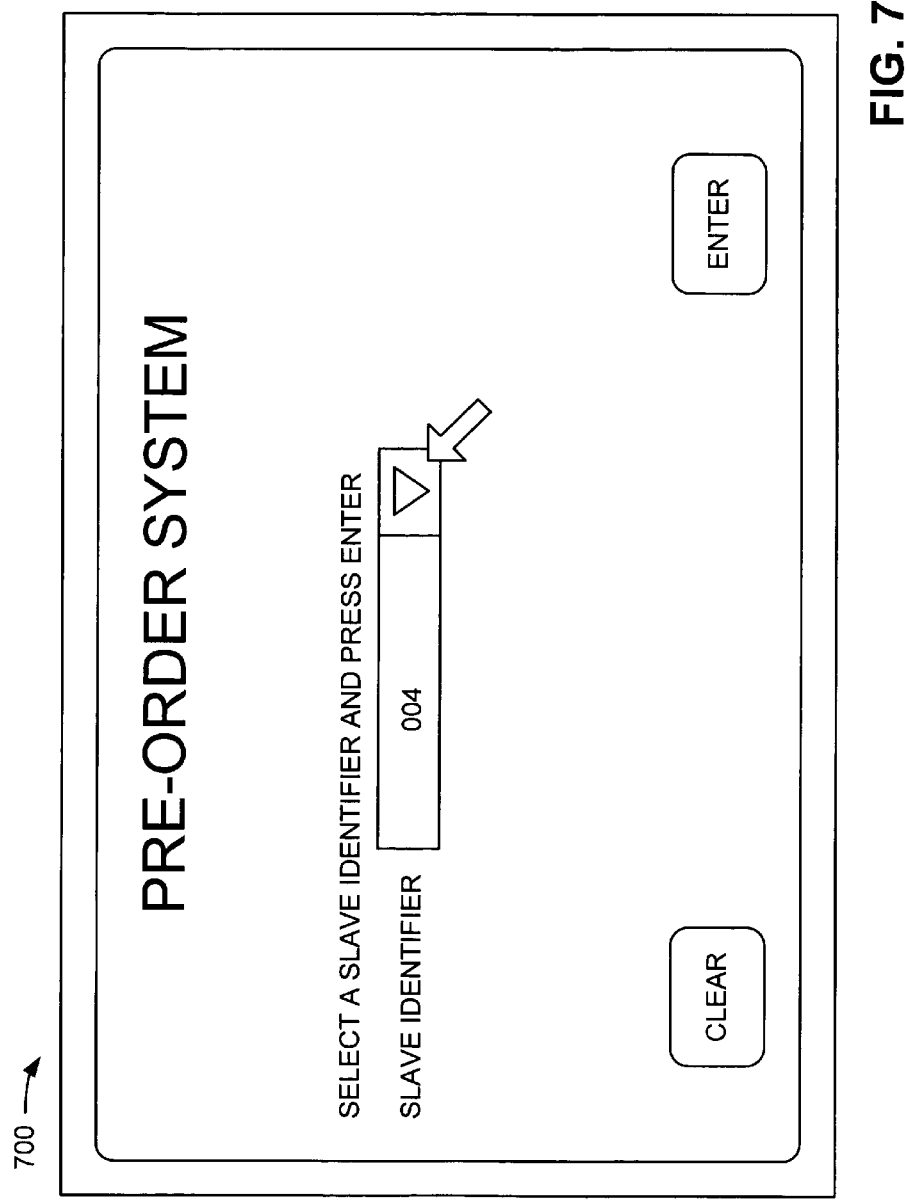
FIGS. 7-10 are exemplary graphical interfaces that may be associated with the master device or slave device of FIG. 1 in an implementation consistent with the principles of the invention.
Figure 8:
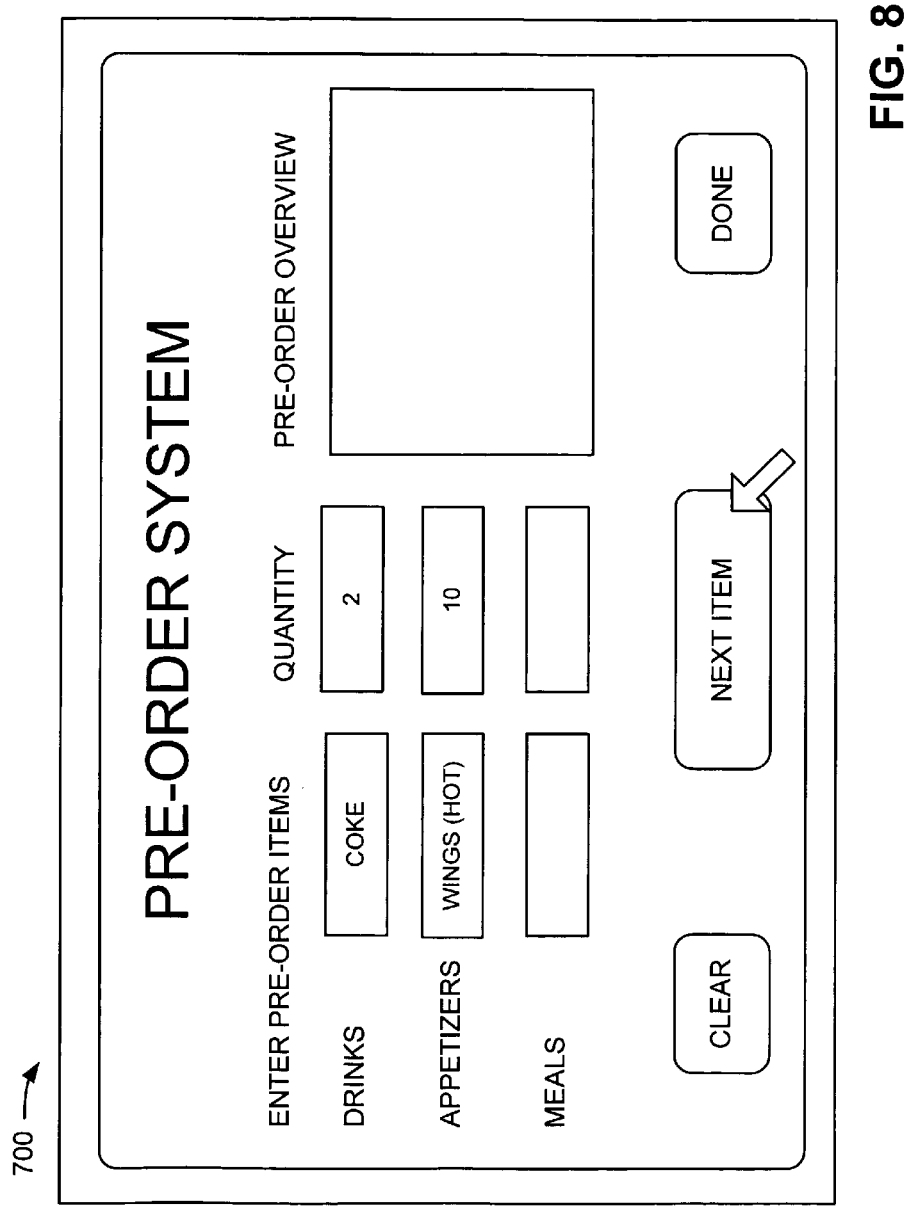
Figure 9:
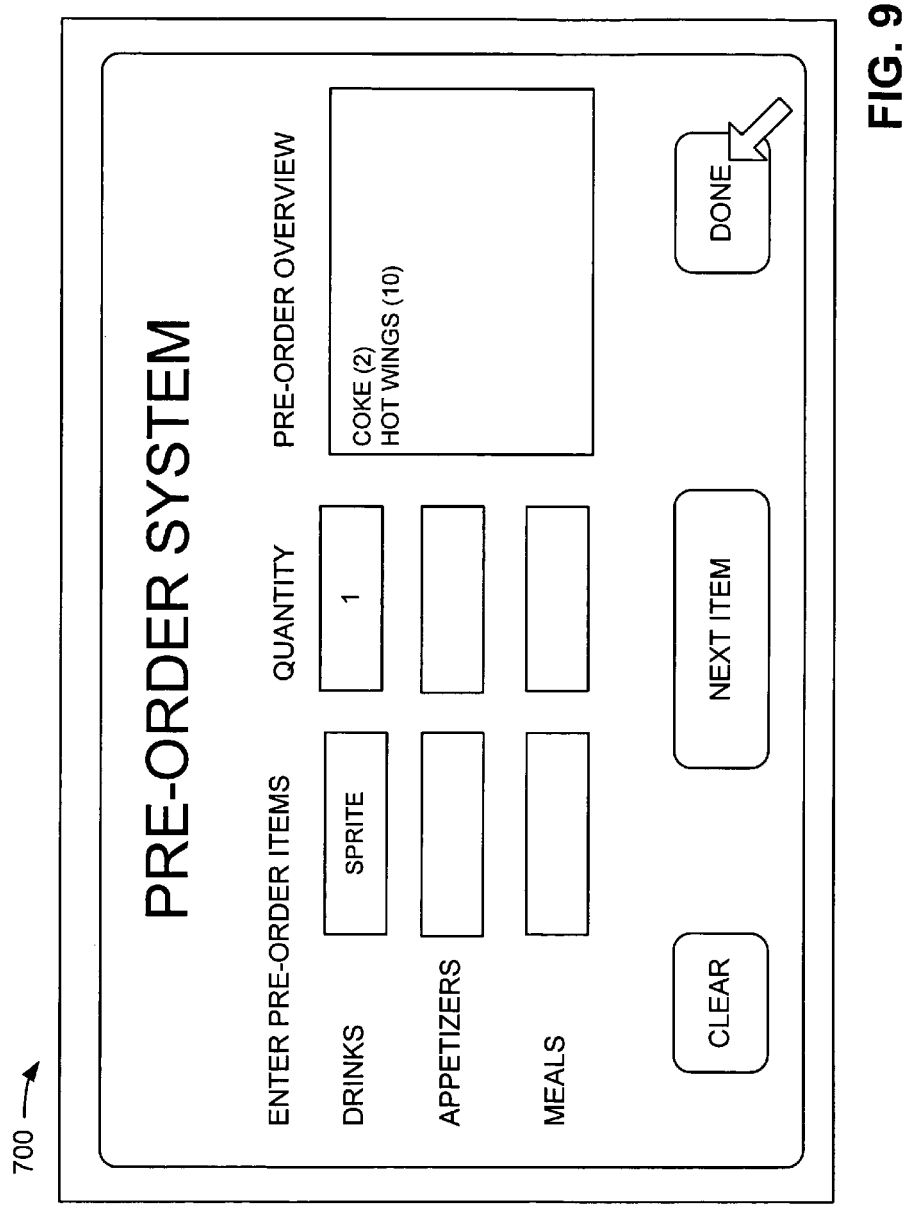
Figure 10:
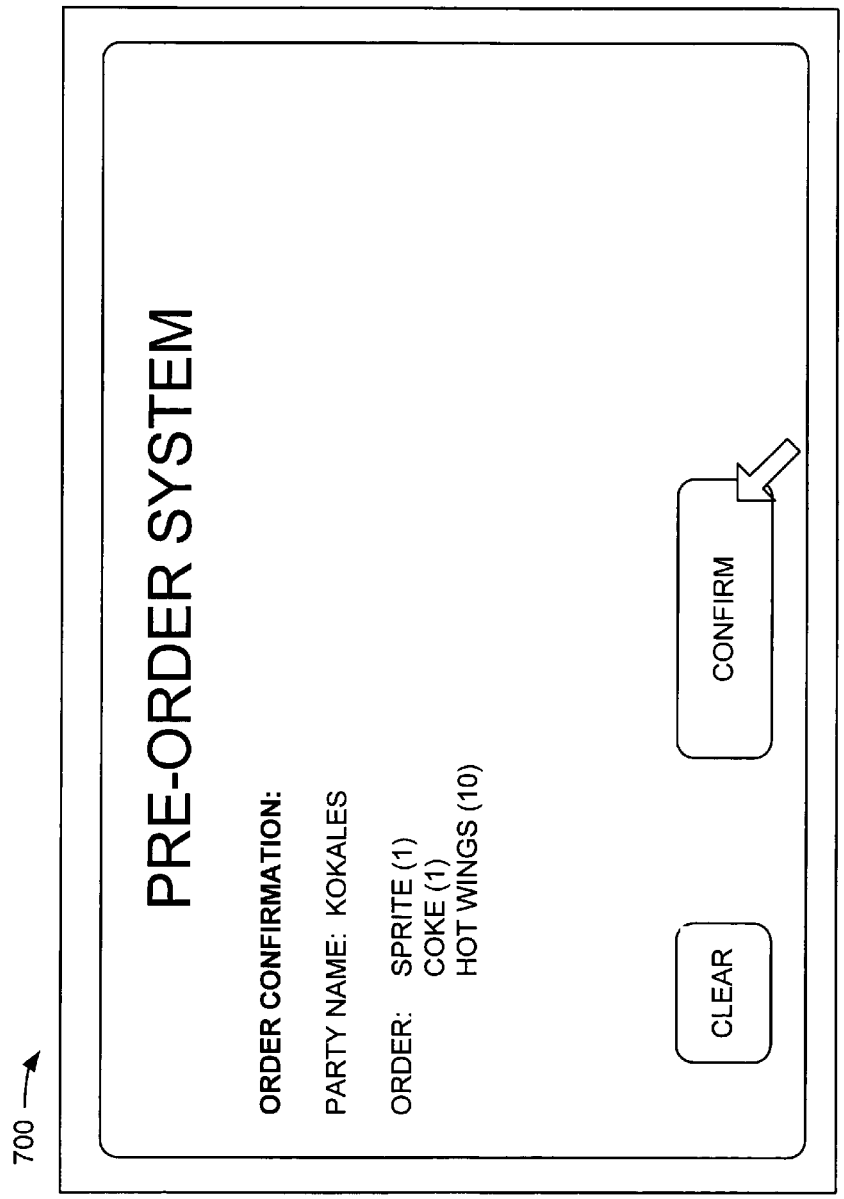

In this example, assume that a waitress has obtained a list of pre-order items from a customer. As illustrated in FIG. 7, the waitress (or another restaurant personnel, such as the hostess) may enter the identifier associated with the customer's slave device 100 into graphical user interface 700. Alternatively, the waitress may enter the customer's name into graphical user interface 700. As illustrated in FIGS. 8 and 9, the waitress may then enter the pre-ordered items into graphical user interface 700 in a well-known manner. For example, the pre-ordered items may be typed into graphical user interface 700, selected via pull-down menus, inserted via voice input, etc. Once all of the pre-order items have been entered, graphical user interface 700 may confirm the order, as illustrated in FIG. 10, prior to storing the pre-order items in database 450.

After the list of pre-order items has been obtained, the pre-order items may be provided to the kitchen for processing based on the customer's position on the waiting list and/or the customer's estimated waiting time (act 570). For example, in one implementation consistent with the principles of the invention, the list of pre-order items may be provided to the kitchen when the customer has reached a predetermined position on the waiting list (e.g., when the customer has reached the top of the waiting list—i.e., is the next to be seated). As another example, the list of pre-order items may be provided to the kitchen when the customer's estimated waiting time reaches a predetermined value (e.g., 5 minutes or some other value). The list of pre-order items may be provided to the kitchen in hard copy format (e.g., master device 120 may output the list of pre-order items for delivery to the kitchen). As another example, the list of pre-order items may be provided to an output device associated with the kitchen (e.g., master device 120 may output the list of pre-order items to a display or a speaker within or near the kitchen of the restaurant).

In this way, a customer's order may be placed while the customer is still waiting to be seated at the restaurant. When the customer is eventually seated, the customer's order may be provided quicker than conventional techniques where the customer is forced to wait after being seated for a waitress/waiter to take his/her order. In this way, customer satisfaction is improved. Moreover, the restaurant can experience faster turnover, resulting in a greater profit for the restaurant.

EXAMPLE

Figure 11:
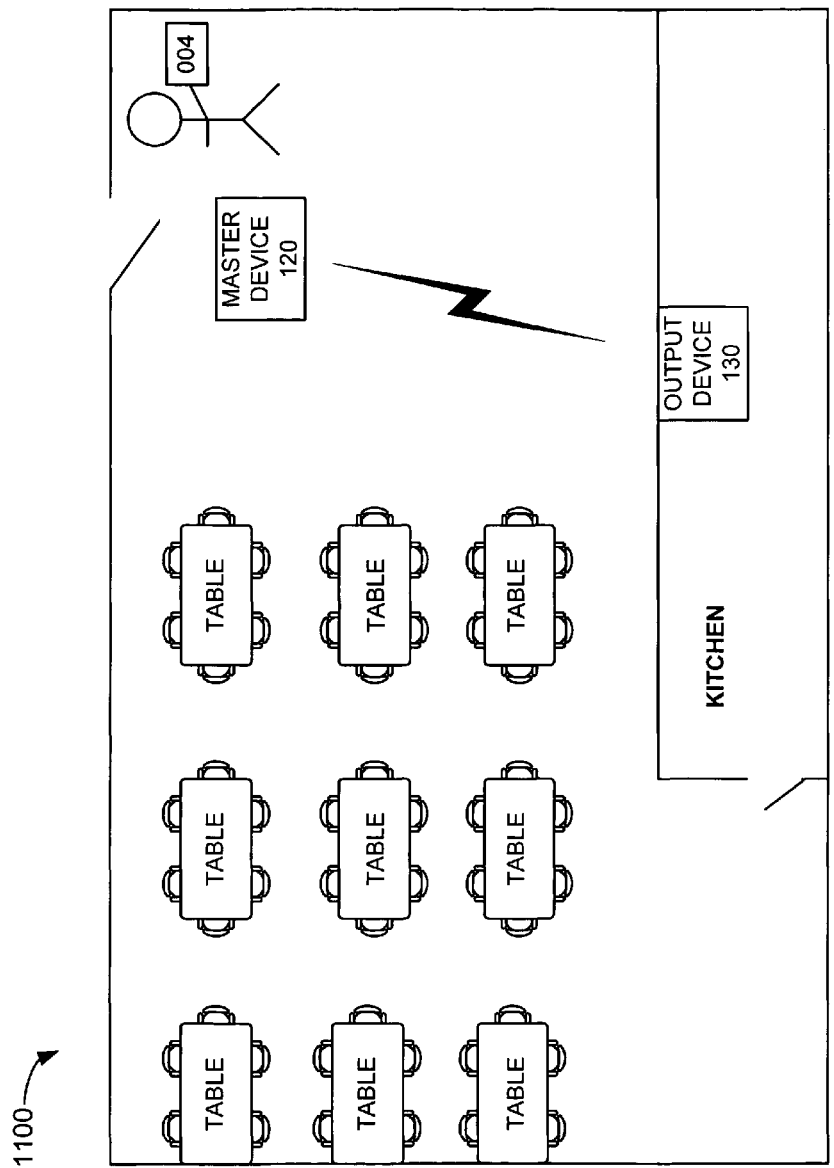
FIG. 11 is an exemplary configuration of an advanced order system in an implementation consistent with the principles of the invention.

The following example illustrates the above processing. Assume that a customer enters a restaurant. Upon entering, the customer may approach the hostess regarding seating at the restaurant. The hostess may obtain the customer's information, such as the customer's name, the number of people in the customer's party, the customer's seating preference (e.g., no smoking, smoking, or first available), etc. The hostess may enter the customer's information into master device 120 and associate the customer with a slave device 110. Assume, as illustrated in FIG. 11, that the customer is associated with a slave device 110 having an identifier of 004. The hostess may then give the customer the slave device 110. Alternatively, some or all of the customer's information may be entered into master device 120 by the customer himself/herself.

The hostess may enter the customer's waiting list position and/or an estimated waiting time into master device 120. Alternatively, master device 120 may determine and store this information itself. Master device 120 may thereafter readjust the waiting list position and/or estimated waiting time at predetermined time intervals or in response to an event, such as another customer being removed from the waiting list.

At some point as the customer is waiting to be seated at the restaurant, the customer may be given the opportunity to pre-order one or more items from the restaurant's menu. For example, a waitress/waiter may obtain the list of pre-order items and store the items in master device 120 or the customer may submit the items to master device 120, via slave device 110, which may then store the items.

When the customer reaches a predetermined position on the waiting list or the customer's estimated waiting time reaches a predetermined value, master device 120 may provide the list of pre-order items to an output device 130. In one implementation, output device 130 may include a printer, which prints out the list of pre-order items in hard copy format. In another implementation, output device 130 may include a display or speaker, which may output the list of pre-order items in a visual or audible format. In any of these situations, the list of pre-order items may be provided to the kitchen for preparation. In this way, the customer's order may be submitted while the customer is still waiting to be seated at the restaurant. When the customer is eventually seated, the pre-order items may be provided to the customer's table. In this way, a customer's order may be satisfied much quicker than if the customer had to wait to submit an order after being seated.

CONCLUSION

Implementations consistent with the principles of the invention allow customers to order food or drink items at a restaurant while the customers are waiting to be seated at the restaurant.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, in some implementations consistent with the principles of the invention, master device 120 may store in database 400 and/or database 450 an indication of the table to which a customer has been assigned. In this way, a waitress/waiter may readily determine to what table a customer's pre-order items should be delivered.

While a series of acts has been described with regard to FIG. 5, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software executing on hardware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   a slave device configured to:
      provide a customer waiting to be seated at a restaurant with menu information for the restaurant, where the menu information is provided to the customer while the customer is physically present at the restaurant,
      receive at least one of a drink order or a food order from the customer while the customer is waiting to be seated at the restaurant, where at least one of drink or food, associated with the at least one of the drink order or the food order, is to be provided to the customer after the customer is seated at the restaurant, and
      transmit the at least one of the drink order or the food order; and
   a master device configured to:
      receive the at least one of the drink order or the food order from the slave device, and
      cause the at least one of the drink order or the food order to be forwarded to a kitchen of the restaurant based on at least one of a position of the customer on a waiting list or an estimated amount of time until the customer will be seated.

2. The system of claim 1 wherein the master device is further configured to:
   receive customer information from the customer, and
   associate the slave device with the customer using the received customer information.

3. The system of claim 1 wherein, when causing the at least one of the drink order or the food order to be forwarded to a kitchen of the restaurant, the master device is configured to:
   produce a hard copy of the at least one of the drink order or the food order.

4. The system of claim 1 wherein, when causing the at least one of the drink order or the food order to be forwarded to a kitchen of the restaurant, the master device is configured to:
   forward the at least one of the at least one of the drink order or the food order to a display device associated with the kitchen.

5. The system of claim 1 wherein, when causing the at least one of the drink order or the food order to be forwarded to a kitchen of the restaurant, the master device is configured to:
   forward the at least one of the at least one of the drink order or the food order to an audio device associated with the kitchen.

6. The system of claim 1 wherein, when causing the at least one of the drink order or the food order to be forwarded to a kitchen of the restaurant, the master device is configured to:

cause the at least one of the drink order or the food order to be forwarded to a kitchen of the restaurant when the estimated amount of time is below a predetermined value.

7. The system of claim 1 wherein, when causing the at least one of the drink order or the food order to be forwarded to a kitchen of the restaurant, the master device is configured to:
cause the at least one of the drink order or the food order to be forwarded to a kitchen of the restaurant when the customer is at a top of the waiting list.

8. The system of claim 1 wherein, when causing the at least one of the drink order or the food order to be forwarded to a kitchen of the restaurant, the master device is configured to:
cause the at least one of the drink order or the food order to be forwarded to a kitchen of the restaurant when the customer is reaches a predetermined position on the waiting list.

9. The system of claim 1 wherein the master device is further configured to:
determine the at least one of a position of the customer on a waiting list or an estimated amount of time until the customer will be seated.

10. The system of claim 9 wherein the master device is further configured to:
re-adjust the determining of the at least one of a position of the customer on a waiting list or an estimated amount of time until the customer will be seated at periodic intervals.

11. The system of claim 9 wherein the master device is further configured to:
re-adjust the determining of the at least one of a position of the customer on a waiting list or an estimated amount of time until the customer will be seated in response to an event.

12. A method comprising:
associating, in a master device, a slave device with a customer waiting to be seated at a restaurant;
obtaining information identifying one or more menu items from the customer via the slave device while the customer is physically present at the restaurant and while the customer is waiting to be seated at the restaurant, where the one or more menu items are to be provided to the customer after the customer is seated at the restaurant;
associating the information identifying the one or more menu items with the customer in the master device;
detecting that a position of the customer on a waiting list or an estimated waiting time for the customer has reached a predetermined value; and
forwarding the information identifying the one or more menu items to a kitchen of the restaurant in response to the detecting, the forwarding occurring while the customer is waiting to be seated at the restaurant.

13. The method of claim 12 wherein the obtaining the information identifying the one or more menu items includes:
obtaining the information identifying the one or more menu items via one or more graphical user interfaces provided by the slave device.

14. The method of claim 12 wherein the forwarding the information identifying the one or more menu items to a kitchen of the restaurant includes:
forwarding the information identifying the one or more menu items to the kitchen of the restaurant in hard copy format.

15. The method of claim 12 wherein the forwarding the information identifying the one or more menu items to a kitchen of the restaurant includes:
forwarding the information identifying the one or more menu items to a display device or an audio device.

16. The method of claim 12 further comprising:
providing the one or more menu items to the customer after the customer has been seated at the restaurant.

17. The method of claim 12 wherein the detecting occurs when the customer has reached a top of the waiting list.

18. A method comprising:
providing a customer waiting to be seated at a restaurant with menu information for the restaurant, where the providing occurs while the customer is physically present at the restaurant;
receiving at least one of a drink order or a food order from the customer based on the providing and as the customer is waiting to be seated at the restaurant, where at least one of drink or food, associated with the at least one of the drink order or the food order, is to be provided to the customer after the customer is seated at the restaurant; and
forwarding, by a device, the at least one of the drink order or the food order to a kitchen of the restaurant based on at least one of a position of the customer on a waiting list or an estimated amount of time until the customer will be seated, the forwarding occurring while the customer is waiting to be seated at the restaurant.

19. The method of claim 18 wherein the forwarding includes:
forwarding the at least one of the drink order or the food order to at least one of a display device or an audio device associated with the kitchen.

20. The method of claim 18 further comprising:
providing the at least one of the drink order or the food order to the customer after the customer has been seated at the restaurant.

* * * * *